United States Patent [19]
Bradley

[11] 3,879,998
[45] Apr. 29, 1975

[54] DEFORMATION RESPONSIVE WEIGHING APPARATUS

[75] Inventor: Richard S. Bradley, Fairmont, Minn.

[73] Assignee: Weigh-Tronix, Inc., Armstrong, Iowa

[22] Filed: June 26, 1973

[21] Appl. No.: 373,790

[52] U.S. Cl............................. 73/141 A; 177/211
[51] Int. Cl. ............................................. G01l 1/22
[58] Field of Search ........ 73/141 A; 177/211; 338/5

[56] References Cited
UNITED STATES PATENTS

| | | | |
|---|---|---|---|
| 3,338,091 | 8/1967 | Tatum | 73/100 X |
| 3,362,219 | 1/1968 | Corbett | 73/141 A |
| 3,548,650 | 12/1970 | Boadle | 73/141 A |
| 3,754,438 | 8/1973 | Matson | 73/141 A |

FOREIGN PATENTS OR APPLICATIONS

| | | | |
|---|---|---|---|
| 988,667 | 5/1951 | France | 73/141 A |
| 263,945 | 6/1970 | U.S.S.R. | 73/141 A |

OTHER PUBLICATIONS

R. E. Conover, Instruments, May 1950, pp. 445–447.

Primary Examiner—Charles A. Ruehl
Attorney, Agent, or Firm—Williamson, Bains & Moore

[57] ABSTRACT

A deformation responsive weighing apparatus for measuring loads applied thereto comprises a straight, longitudinal bar of uniform circular cross section which is elastically deformable in response to loading, the bar being retained by bar supporting members adjacent the ends of the bar. A load applying member is located on the bar between the bar supporting members, the bar supporting members cooperating with the load applying member to elastically deform the bar from a straight condition as a load is applied to the bar. Each supporting member includes a bar mounting socket to receive an end of the bar, and a pin aperture in each socket is arranged in registering relationship with pin bores at the ends of the bar to form passages through bar and socket which are generally perpendicular to a plane defined by the central axis of the bar and the load vector. Pins extend through the pin apertures and pin bores at the ends of the bar to retain the bar in the sockets. Strain gauges are mounted on the bar to measure the deformation of the bar, and measuring circuitry detects the changes in electrical properties of the strain gauges caused by loading to provide a measurable response indicating the magnitude of the load.

12 Claims, 9 Drawing Figures

DEFORMATION RESPONSIVE WEIGHING APPARATUS

BACKGROUND OF THE INVENTION

Numerous weight measuring transducers utilize strain gauges to measure applied loads. It has been recognized that commercially available strain gauges are accurately responsive to loading when the gauges are deformed only by the load. In practice, however, the mounting of the bar or like instrumentally on which the strain gauges are positioned often introduces unwanted extraneous deformations into the bar which are responsible for inaccurate measurements. For example, if the bar is twisted by the mounting or other internal stress introduced into the bar, these deformations will be detected by the strain gauges and will produce a measurable deviation in accuracy of the transducer. In addition, the point at which the load is applied, if variable, can introduce errors into the measurement process. The present invention provides an apparatus which avoids or overcomes the major sources of extraneous deformation and the errors associated therewith.

In addition, it is desirable to mount the strain gauge bearing bar or like instrumentality such that it deforms linearly in response to loading. When deformation of the bar is linear, the locations on the bar at which strain gauges are positioned are not as critical, and greater accuracy of measurement is possible with minimal electrical conversion equipment. It is particularly desirable to avoid what is known to the art as reverse bending of the bar. Such bending occurs when one or more ends of the bar are rigidly, immovably fixed. When such a fixed bar is loaded, an S-like bend results wherein bending of the bar is non-linear resulting in complex and expensive electrical measurement equipment being needed to correct for such non-linearity and to produce a meaningful readout of the magnitude of the applied load. In addition, when reverse bending occurs, it has been found necessary to use a larger diameter bar for mounting of the strain gauges since the stresses on the bar are greater than with a bar whose ends are free to move in response to loading of the bar.

BRIEF SUMMARY OF THE INVENTION

This invention relates to the field of strain gauge weighing devices and comprises a novel new weighing apparatus for accurately measuring a wide variety of loads covering a substantial range of magnitudes.

The invention utilizes a substantially straight, uniform, circular cross-section, longitudinal bar which is elastically deformable in response to loading. The bar is retained at its ends by bar supporting members, a load applying member being positioned on the bar between the bar supporting members. Strain gauges mounted on the bar detect the linear deformation of the bar caused by loading thereof, and in response to such deformation undergo changes in their electrical properties which are readily measurable by electrical measuring circuitry, providing an electrical indication of the magnitude of the load applied to the transducer.

As the apparatus is loaded, the bar supporting and load applying members exert forces on the bar, the members cooperating to elastically deform the bar from its initially straight unloaded condition.

Each of the supporting members includes a bar mounting socket to retain an end of the bar. A pin aperture in each socket is in registering relationship with a pin bore in the bar, and a pin extends through bore and socket to retain the bar in the socket. This pin should be aligned perpendicular to the plane defined by the central axis of the bar and the load vector to minimize extraneous deformation of the bar and thereby increase the accuracy of the apparatus. The load applying member is attached to the bar in the same manner as the supporting members to achieve the same objectives.

The apparatus may be used to measure substantially any magnitude of load, yet it is extremely rugged, economical to manufacture, highly resistant to breakage, and long lasting.

The apparatus can be utilized for a wide variety of weight measuring tasks, among which are load sensing in conventional platform scales and measuring the load applied to the first body or object by a second body pulling, lifting, or pushing on the first body. Many uses and applications for the invention will be apparent to those skilled in the art, from the following description.

DETAILED DESCRIPTION

Figure 1:
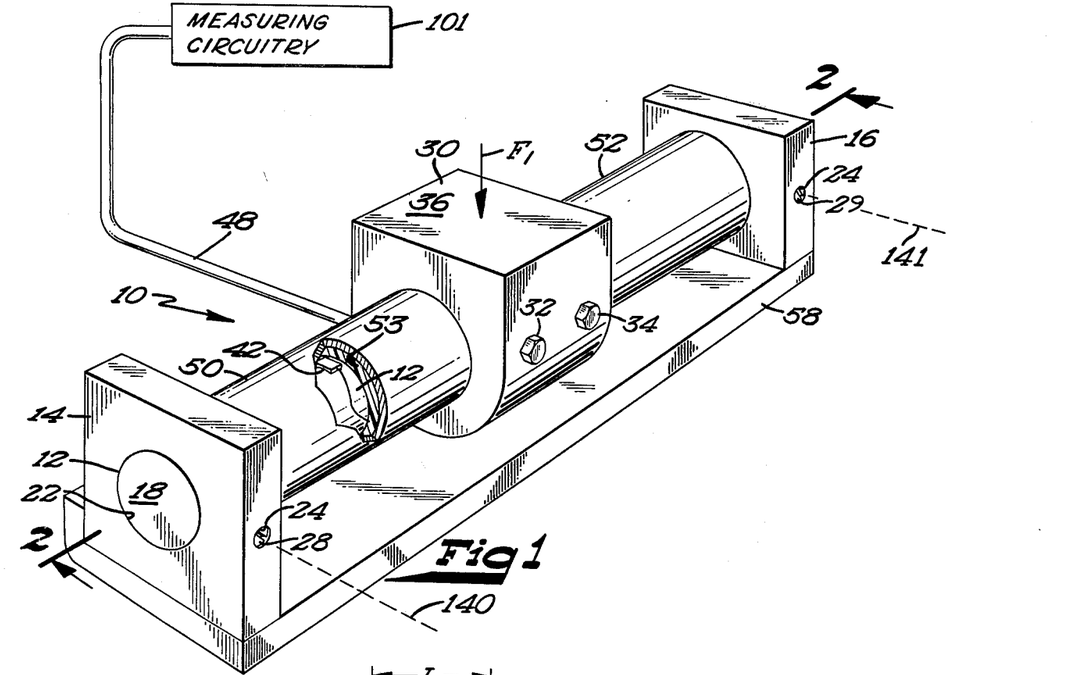
FIG. 1 is a front perspective view of a deformation responsive weighing apparatus embodying the invention.

Referring now to FIG. 1, the deformation responsive weighing apparatus 10 embodying the invention has a substantially straight, longitudinal bar 12 of circular cross-section, the bar being retained between first and second bar supporting members 14 and 16, respectively.

The bar 12 is a uniform and continuous from end 18 to end 20, and is formed of a strong rigid material such as steel, the material selected being substantially elastically deformable in response to forces applied between the ends 18 and 20 of the bar. Although the bar 12 is here shown as a solid structure, it is possible for it to have a hollow core, so long as the wall of the bar has adequate strength to withstand the loads applied thereto.

Figures 3, 5:
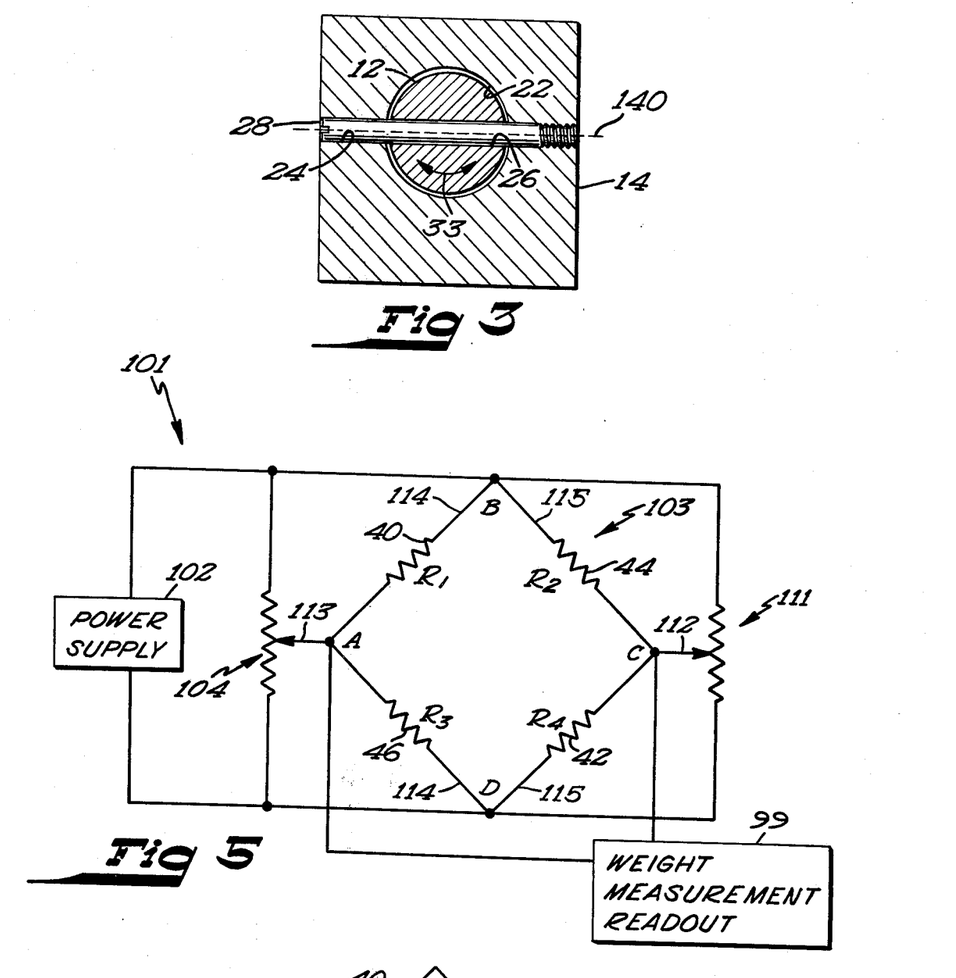
FIG. 3 is a cross-sectional view taken approximately along line 3—3 of FIG. 2 and looking in the direction of the arrows.
FIG. 5 shows a schematic electrical circuit diagram of electrical measuring circuitry useable with the invention.

First member 14 is formed of rigid metal such as steel or the equivalent, and is provided with a bar mounting socket 22 in which bar 12 is loosely supported. A pin aperture 24 in the member 14 passes through the socket 22 and may be partially threaded as shown in FIG. 3. The bar 12 has a pin bore 26 passing transversely therethrough adjacent the end 18 of the bar, the bore 26 being arranged to align with the aperture 24 in the member 14. Member 16 is provided with a bar mounting socket 22 and pin aperture 24 which are identical to those in the member 14. Ends 18 and 20 of the bar have bores 26 which are arranged to align with apertures 24 and receive a pin therethrough as described hereafter. The supporting members 14 and 16 include pins 28 and 29 which are passed through the apertures 24 in members 14 and 16, and through the bores 26 in the bar 12 to retain the bar 12 in the supporting members 14 and 16.

It is preferred that the bores 26 have a slightly larger diameter than the pins 28 and 29 in order to allow bar 12 to undergo small amounts of axial movement 31 and rotational movement 33 (FIG. 3) within the sockets 22 without twisting or stressing the bar. By permitting such movement between the supporting members 14 and 16 and bar 12, twisting deformation and other extraneous deformations of the bar can be substantially reduced and unwanted measuring errors caused by such extraneous deformation are reduced, thereby increasing accuracy. Since bar supporting member 16 is identical to member 14, member 16 will not be described in further detail.

Figure 2:
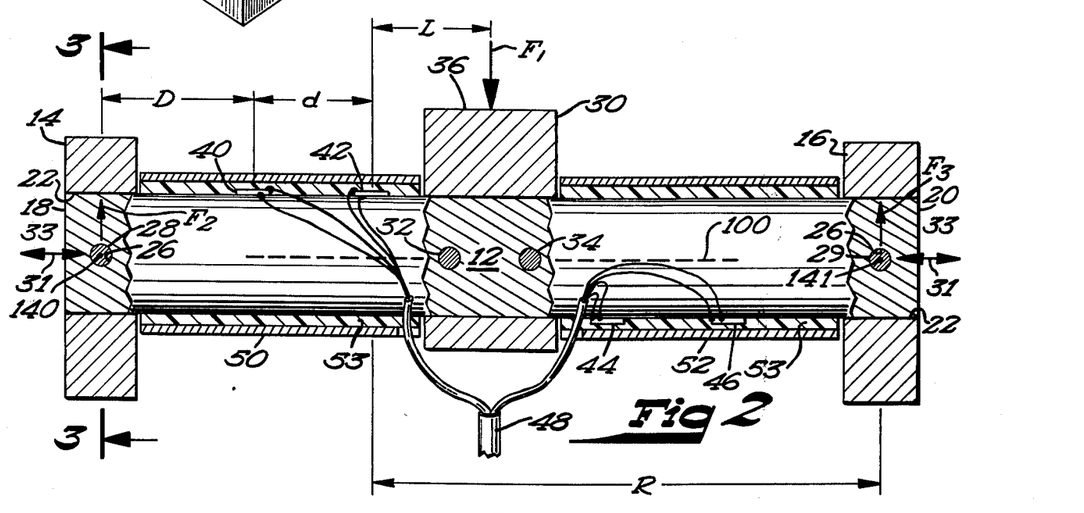
FIG. 2 is a cross-sectional view of the apparatus of FIG. 1 taken along cutting plane 2—2 with a portion of the base omitted.
Figure 8:
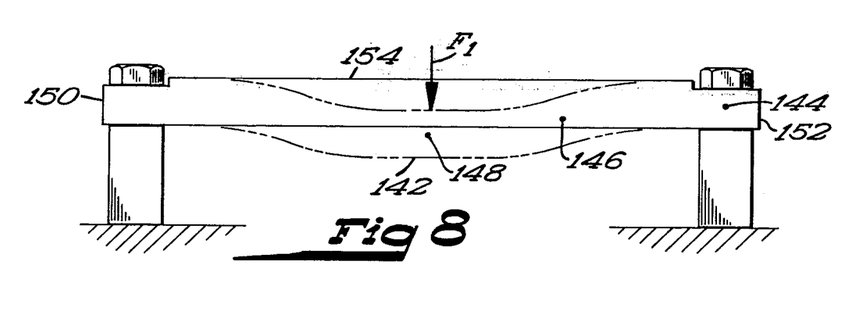
FIG. 8 is a front diagrammatic elevation view, partly in phantom, of a fixed bar and illustrating reverse non-linear bending of the bar.

It is important that the ends 18 and 20 of the bar 12 be free to move about axes 140 and 141, respectively, in response to loading of the bar. These axes are perpendicular to a plane defined by the longitudinal axis 100 of bar 12 and the load vector $F_1$. Referring now to FIG. 2, the pins 28 and 29 pass through the bores 26 of bar 12, supporting the bar within the sockets 22, the outer periphery of the bar being spaced from the inner surface of the socket 22 when the bar is undeformed. When a load $F_1$ is applied to the bar 12, the bar deforms linearly from one end to the other, the ends of the bar moving abut the axes 140 and 141 of pins 28 and 29. As such movement occurs, it is desirable that the outer periphery of the bar not engage the inner surface of the sockets 22 in order to avoid reverse bending and nonlinear deformation of bar 12. Accordingly, sufficient spacing is allowed between bar 12 and the inner surfaces of sockets 22 to permit movement of the bar about the axes 140 and 141 without substantial contact with the inner surfaces of the sockets 22. This spacing is helpful in achieving accuracy of the apparatus. When the ends 150 and 152 of the bar are rigidly, immovably fixed as in FIG. 8, such that they cannot undergo any substantial movement in response to load $F_1$ then the bar 154 undergoes reverse bending 142 as shown in phantom and greatly exaggerated for illustrative purposes. The reverse bending of the bar 154 results in an S-like curve extending from point 144 to point 146 to point 148, and a like S-like curve at the remaining end of the bar. Reverse bending is not linear in its deformation and to be acceptable in load measurement requires extensive and costly electrical compensating networks. For these reasons, it is desirable to avoid reverse bending.

Figure 9:
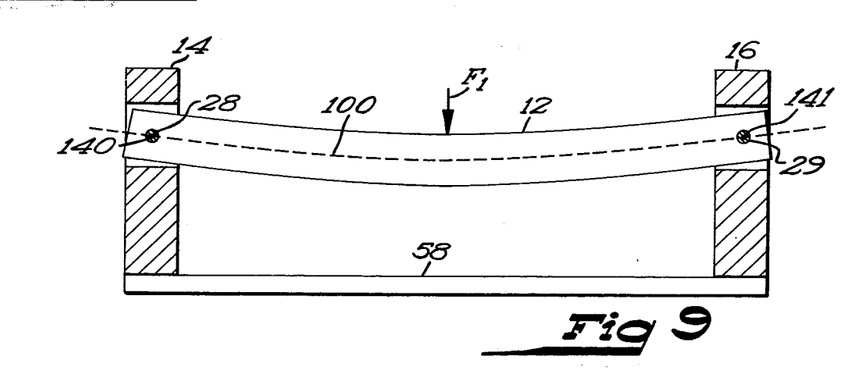
FIG. 9 is a diagrammatic view illustrating linear bending of the bar of the apparatus of FIG. 2.

Referring again to FIG. 2, since the bar 12 is free to move about axes 140 and 141, the ends of the bar are free to move upwardly as shown in FIG. 9 in response to downwardly directed load $F_1$, and no reverse bending occurs. Accordingly, the nonlinear deformation caused by reverse bending is eliminated by mounting the ends of the bar 12 so the ends can move about axes perpendicular to a plane defined by the load vector $F_1$ and the longitudinal axis 100 of the bar when the bar is loaded.

It should be understood that some limited amount of reverse bending of a bar is not harmful to accurate measurement if the nonlinearities which are introduced in the bar contribute errors too small to be of consequence to the measuring accuracy required. The nonlinear reverse bending of the bar is maximized when the ends are rigidly fixed. As the constraints on the ends of the bar are reduced and increased movement of the bar ends is permitted, the extent of reverse bending decreases. It is advisable to reduce the extent of reverse bending to the level where it generates no substantial error in the accuracy required for the load measurement. Accordingly, it is feasible for the ends of the bar to make some contact with the inner surfaces of the sockets 22 during loading without nonlinear deformation caused by reverse bending becoming so troublesome as to be intolerable. The amount of such reverse bending which is tolerable during an operation is determined by the degree of accuracy required from the apparatus 10.

Figure 7:
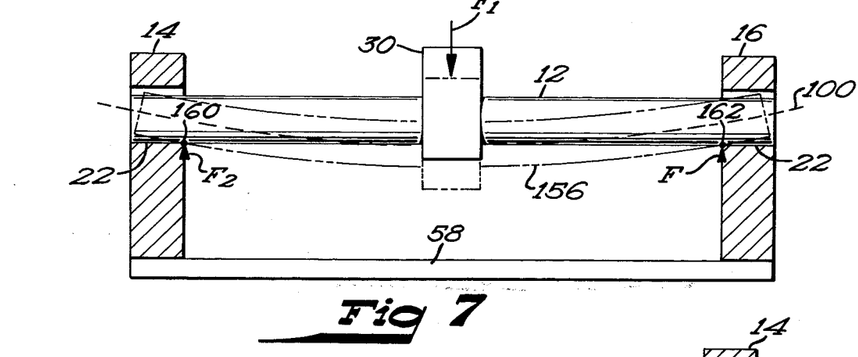
FIG. 7 is a diagrammatic front elevational view, partly in phantom, illustrating linear bending of the bar of the apparatus of FIG. 1 and showing an alternative manner of mounting the ends of the bar.

While the pins 28 and 29 are a preferred structure for retaining the bar 12 and contribute substantially to the creation of a highly reliable and sturdy weighing apparatus, the bar may be supported directly by the sockets 22 as shown in FIG. 7 without the pins 28 and 29 being used and satisfactory results obtained. It is desirable to leave sufficient clearance between the bar 12 and the inner surface of the socket 22 so as to avoid constraining the bar to the extent that reverse bending produces unacceptable nonlinearities of deformation. When a load $F_1$ is applied to the bar, the bar deforms linearly to a position 156, the displacement being greatly exaggerated for illustrative purposes, the bar moving about axes 160 and 162, seen end on, which are perpendicular to the plane defined by load vector $F_1$ and longitudinal axis 100 of the bar. Reaction forces $F_2$ and $F_3$ are applied to the bar at their points of contact with the sockets 22 during loading.

An interconnecting base 58 extends between the supporting members 14 and 16 and provides a convenient base or platform for the members 14 and 16 as well as providing structural reinforcement for the supporting members to keep them in the shown upright orientation. The base 58 may be attached to the members 14 and 16 in any known manner. It should be understood, however, that the base 58 is desirable, but it is not essential to the operation of the transducer 10 and the members 14 and 16 are adequate to support the bar. In addition, while the members 14 and 16 and the base 58 have been shown as separate structures, it is equally feasible that these structures could be a combined integral cradle and such a cradle is within the purview of the invention.

A third member 30 is positioned on the bar 12 and retained thereon by pins 32 and 34 which pass through the member 30 and the bar 12 (FIG. 2), resulting in the third member 30 being snugly retained on the bar 12.

The third member 30, which is typically a load applying member, is provided with a load surface 36 to which the load $F_1$ is applied to elastically deform the bar 12 as will be further described hereafter. While the member 30 is shown herein as having a particular geometrical shape, it should be understood that the shape of the member 30 may be varied. So long as the member 30 provides a structure by which a load $F_1$ may be evenly applied to a selected portion of the bar 12, whether the member be block-like as shown in FIG. 1 or taking the form of a sleeve, a shoulder integral with and on the bar, or other equivalent structure, it has been found effective, and accordingly, other shapes and configurations of the load applying member 30 are within the purview of the invention. It should also be understood that while it is preferred to position the member 30 so that it is equally spaced between members 14 and 16, the load applying member 30 need not be positioned midway between the ends 18 and 20 of the bar, and can be positioned at other positions along the bar with satisfactory results; accordingly, alternative positions of the load applying member 30 are also within the purview of the invention.

Referring now to FIGS. 1 through 3, it has been found most effective to have pins 28 and 29 aligned perpendicular to the plane defined by the central axis of the bar and the load vector $F_1$. With the shown arrangement of forces, the pins pass horizontally through the bar 12 resulting in minimal extraneous deformation to the bar 12. If the pins 28 and 29 were oriented vertically, a force moment would be generated at opposite ends of each bore 24 when the bar 12 was loaded, such force moments being undesirable in that they generate extraneous deformation of the bar by producing internal stress and can result in inaccuracies of measurement.

For minimal extraneous deformation of the bar 12, the pins 28 and 29 should have their axes perpendicular to a plane defined by the load vector $F_1$ and the axis 100 of the bar 12.

It has been found desirable to have the pins 32 and 34 which retain the third member 36 to bar 12 oriented perpendicular to a plane defined by the force vector $F_1$ and the axis 100 of the bar 12. By such arrangement, minimal extraneous deformation of the bar 12 is produced by force moments generated by interaction between the pins 32 and 34 and the bar 12 when the load $F_1$ is applied to the member 36.

Electrical strain gauges are mounted on the bar to detect the deformation of the bar produced by the load $F_1$. These strain gauges are well known to the art and after being firmly affixed to the surface of the bar detect deformation by varying their electrical properties as the strain gauges are compressed or extended as the bar 12 is deformed. Typically, these strain gauges are of the resistance wire type or alternatively may be of foil or semi-conductor construction. When such strain gauges are compressed, their electrical resistance decreases. The increases or decreases in strain gauge resistance caused by deformation of the bar are detected by appropriate electrical measuring circuitry 101 which will be described hereafter.

Referring now to FIG. 2, when a load $F_1$ is applied to the member 36 as first and second members 14 and 16, respectively, firmly retain the ends of the bar 12 in position, the bar 12 is deformed, the center of the bar moving downward in the course of this deformation. Application of the load $F_1$ causes the surfaces on which strain gauges 40 and 42 are mounted to become compressed, while the surfaces on which strain gauges 44 and 46 are mounted become extended. Accordingly, strain gauges 40 and 42 decrease their electrical resistances, and strain gauges 44 and 46 increase their electrical resistances. To obtain substantial deformation of the strain gauges in response to a given load $F_1$, it has been found desirable that the strain gauges be positioned on the bar 12 in a plane defined by the axis 100 of the bar 11 and the load vector $F_1$. While it is not essential for effective measuring that the strain gauges be intersected by or centered on this plane, it is desirable.

Positioning the strain gauges so that they will be intersected by the described plane produces marked advantages in that the apparatus 10 retains its high sensitivity to a load $F_1$ while being relatively unresponsive to the following extraneous deformation. In the event extraneous undesired forces are applied to the bar 12 from a direction perpendicular to the plane of the drawing in FIG. 2, it will be noted that the strain gauges 40, 42, 44 and 46 will be deformed in the same manner, causing their electrical resistances to change identically. The electrical measuring circuitry used with the invention is arranged to be unresponsive when all resistances change identically. Accordingly, the positioning of the strain gauges substantially in the described plane results in the apparatus being relatively insensitive to extraneous forces in the directions perpendicular to the plane of the drawing of FIG. 2. Correspondingly, forces in the directions 31 along axis 100 of bar 12 also cause the four shown strain gauges to be deformed identically and whenever the gauges are deformed identically the electrical measuring circuitry will be unresponsive to the forces generating such extraneous deformation. If the forces applied to the bar 12 cause twisting of the bar 12, each of the strain gauges senses an identical deformation and each changes its resistance identically. Accordingly, extraneous deformation caused by twisting of the bar does not produce any substantial response by the measuring circuitry.

Referring now to FIG. 5, a circuit 101 constituting the electrical measuring circuitry for the invention contains a power supply 102 which is connected between terminals B and D of bridge circuit 103. Weight measurement readout equipment 99 is connected between points A and C of the bridge 103, the weight measurement readout equipment comprising the necessary current flow detection circuitry to detect an unbalanced condition of bridge 103 as the strain gauge resistances vary in response to loading. The equipment 99 also includes circuitry necessary to produce a visible reading so an operator can determine the load applied to the bar 12. A potentiometer 104 is connected between terminals B and D of the bridge 103 and has its movable terminal 113 extending to point A of the bridge 103, the potentiometer being so positioned to permit an operator to balance the bridge to create an arbitrary zero load reference level. By using the potentiometer 104, an operator can balance the bridge even when a given load is acting on the bar, thereby permitting the operator to measure additional increments of load added to the weighing apparatus 10. A second potentiometer 111 is connected between terminals B and D of the bridge and has its movable terminal 112 connected to point C.

A first current path 114 extends from terminals B to A to D and includes resistance $R_1$ and $R_3$. A second current path 115 extends from terminals B to C to D and includes resistances $R_2$ and $R_4$. The common power source 102 is connected across terminals B and D of these current paths. In describing the manner in which the strain gauges are connected in the bridge 103, the arms of the bridge which extend from point B to point A and from point C to point D will be referred to as opposite arms since they lie opposite one another; the bridge arms extending between points B and C and from A to D are also opposite arms. The same descriptive terms can be used to refer to the bridge 105 in FIG. 6, the term "opposite arms" and first and second current paths having the same meaning in terms of the reference points $A_1$, $B_1$, $C_1$, and $D_1$ as was used with the terms A, B, C and D.

It should be understood that the illustrated electrical circuitry and measuring bridge for use with the invention is merely illustrative and other alternative electrical bridges known to the art may be used with the invention and are within its purview.

Referring now to FIG. 2, four strain gauges are operatively mounted on the bar, a pair being mounted between the load applying member 30 and support member 14 and a second pair between members 30 and 16. Strain gauges 40 and 42 are positioned between the member 30 and end 20 of the bar to detect compression when the load $F_1$ is applied and gauges 44 and 46 are mounted to detect simultaneous extension of the bar. The strain gauges are affixed to the bar 12 by an adhesive as is well known to those skilled in the art. The electrical connections from each of the strain gauges are consolidated in a cable 48.

When a force $F_1$ is applied to member 36, reaction forces $F_2$ and $F_3$ are applied to the bar by the members 14 and 16 respectively. Referring now to FIG. 2 where the strain gauges 40 and 42 are a distance d apart and strain gauge 40 is a distance D from the reaction force $F_2$. The bending moment of load $F_2$ about strain gauge 40 is $F_2 D$. Similarly the bending of $F_2$ about strain gauge 42 is $F_2(D+d)$.

Similarly the bending moment of force $F_1$ about strain gauge 42 when the distance from $F_1$ to strain gauge 42 is L is $F_1 L$; the bending moment of force $F_1$ about strain gauge 40 is $F_1(L+d)$.

Similarly the bending moment of force $F_3$ about strain gauge 42 when the distance from $F_3$ to strain gauge 42 is R is $F_3 R$, and the bending moment of $F_3$ about gauge 40 is $F_3(R+d)$.

The absolute difference between the moments at strain gauge 42 and strain gauge 40 for forces $F_1$, $F_2$ and $F_3$, which will be referred to hereafter as the differential bending moment, is $$\Sigma |M_{40} - M_{42}| = F_2 D - F_2(D+d) + F_1 L - F_1(L+d) + F_3 R - F_3(R+d)$$
$$= (F_1 + F_2 + F_3) d$$

This result indicates that the absolute difference in the moments of all the forces at strain gauges 42 and 40 is independent of the distances between the points of force application and the points at which the strain gauges are affixed, and depends only on the distance between the two strain gauges. A similar result can be shown for strain gauges 44 and 46. Thus it is not important where the strain gauges are positioned on the bar relative to the points at which the forces $F_1$, $F_2$ and $F_3$ are applied. By arranging the electrical measuring circuitry used with the invention to measure the difference between the bending moments of the two strain gauges making up each pair of gauges, the electrical readout of the circuit will not depend on the distance between the applied forces and the strain gauges. Appropriate measuring circuitry, described hereafter, utilizes this principle which will hereafter be referred to as the differential bending moment principle.

In assembling the shown transducer 10, the bar 12 has its load applying member 30 pinned thereto as shown in FIG. 2, and the strain gauges 40, 42, 44 and 46 are operatively affixed to the periphery of the bar 12. Protective sleeves 50 and 52 formed of metal or other protective material are then slid onto the bar and over the strain gauges from ends 18 and 20, respectively, of the bar and terminate adjacent the load applying member 30. A potting compound 53 such as epoxy or the like is then poured between the bar 12 and the inner periphery of the sleeves 50 and 52 and permitted to harden, thereby filling the gap between bar 12 and sleeves 50 and 52 to protect and weatherproof the strain gauges. The sleeves 50 and 52 terminate short of the ends 18 and 20 of the bar 12 and do not pass within apertures 22 of the supporting members 14 and 16. The sleeves 50 and 52 along with the potting compound 53 represent envelope means surrounding the otherwise exposed periphery of the bar so as to prevent damage to the strain gauges. Naturally, other types of materials could also serve as envelope means and all such structures as would be apparent to one skilled in the art are within the purview of the invention. The cable 48 passes through apertures in the sleeves 50 and 52 and leads directly to the electrical circuitry 101.

Figure 4:
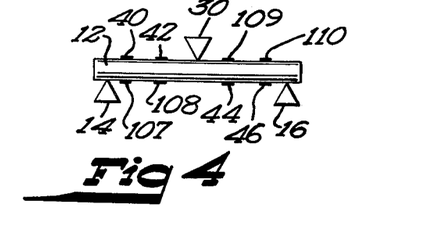
FIG. 4 shows an alternative mounting arrangement for strain gauges used on the apparatus.

While a particular number and arrangement of strain gauges was shown on bar 12 in FIGS. 1 and 2, it should be understood that additional pairs of strain gauges may be used with the bar. Referring how to FIG. 4 the bar 12 is shown with the end supporting members 14 and 16 represented symbolically as is the load applying member 30. Four pairs of strain gauges are mounted on the bar, two pairs of strain gauges being located on each side of the load applying member; two pairs are positioned on the upper surface and two pairs on the lower surface of the bar.

When two pairs of strain gauges are utilized on the invention as shown in FIG. 2, these strain gauges are positioned in the electrical measuring circuitry 101 as will now be described. Strain gauges 40 and 42 which comprise a pair of strain gauges are mounted in the Wheatstone bridge 103 such that one of these strain gauges is in the first current path 114 and the second strain gauge is in the second current path 115. In addition, the strain gauges are connected in opposite arms of the bridge. To illustrate, strain gauge 40 could be connected as $R_1$ in bridge 103 and strain gauge 42 as $R_4$ in the opposite arm of the bridge. Correspondingly, the strain gauges 44 and 46 making up the second pair of strain gauges on the bar 12 would be connected such that strain gauge 44 is $R_2$ and strain gauge 46 is $R_3$. One of the strain gauges constituting each pair of strain gauges is connected in one current path and the second strain gauge of the pair is connected in the second path and in opposite arms of the bridge 103.

Figure 6:
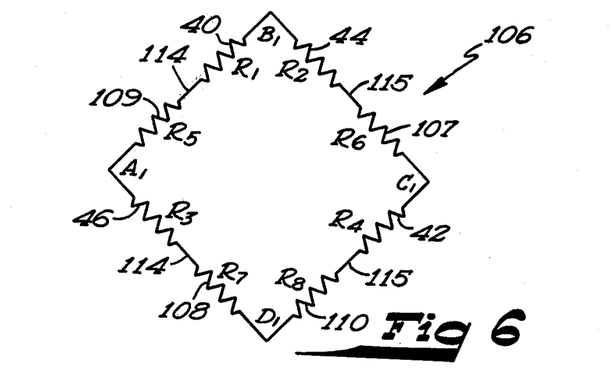
FIG. 6 shows an alternative electrical measuring bridge arrangement useable with the circuit of FIG. 5.

When four pairs of strain gauges are used on the bar 12 as illustrated in FIG. 4, the arrangement of strain gauges in the bridge is as shown in FIG. 6 where strain gauges 40, 42, 44 and 46 are connected in bridge 106 in the same manner as already described for bridge 103 in FIG. 5, strain gauge 40 being connected as $R_1$, strain gauge 42 as $R_4$, strain gauge 44 as $R_3$, and strain gauge 46 as $R_2$. The additional two pairs of strain gauges are connected as follows: strain gauge 109 may be connected as $R_5$ and strain gauge 110 as $R_8$; strain gauge 107 may be connected as $R_6$ and strain gauge 108 as $R_7$.

It should be noted that one strain gauge of each pair is connected in the first current path 114 and the second strain gauge in the second current path 115 and that the two strain gauges are in opposite arms of the bridge. The bridge 106 shown in FIG. 6 is positioned in the circuitry of FIG. 5 in place of the bridge 103 defined by points A, B, C, and D, corresponding letters being corresponding points in the circuit.

In operation, the bar supporting members 14 and 16 are placed on a firm base or alternatively are firmly retained in any way known to the art, and the potentiometer 104 of the electrical measuring circuitry is then adjusted to balance the Wheatstone bridge 103 so as to obtain a null condition where the voltage at points A and C is the same and no current flow occurs between points A and C through the weight measurement readout circuitry 99. A load $F_1$ may now be applied to the bar 12 at member 30.

Application of load $F_1$ to the member 30 applies the load directly to the bar 12 and also causes a pair of reaction forces $F_2$ and $F_3$ to be applied to the bar at the ends 18 and 20 by the bar supporting members 14 and 16, respectively. The forces $F_2$ and $F_3$ are oppositely directed to the force $F_1$ and the sum of the forces $F_2$ and $F_3$ is equal to the magnitude of force F, but oppositely directed. Accordingly, the first and second bar supporting members in exerting reaction forces $F_2$ and $F_3$ on bar 12 cooperate with the load applying member 30 to elastically deform bar 12 from a straight condition as the load $F_1$ is applied to the bar deforming member 30. The strain gauges mounted on the bar 12 (FIG. 2) detect the deformation of the bar surface and their electrical resistances change in proportion to the deformation.

Strain gauges 40 and 42 are located on a surface of the bar 12 which will be compressed, and accordingly, the resistances of strain gauges 40 and 42 decrease. Strain gauges 44 and 46 are on a surface which will be extended or stretched and the resistances of these strain gauges increase.

For reasons described earlier herein it is desirable to substract the force moments of each pair of strain gauges by utilizing appropriate measuring circuitry in order to utilize the differential bending moment principle. Accordingly the bending moment at strain gauge 42 will be subtracted from the moment at strain gauge 40; and the bending moment at strain gauge 46 will be subtracted from the moment at strain gauge 44. To accomplish these subtraction objectives strain gauge 40 is connected as $R_1$ and 42 as $R_4$ in separate current paths 114 and 115, respectively, and in opposite arms of the bridge 103. Correspondingly strain gauges 44 and 46 are connected as $R_2$ and $R_3$ respectively, in opposite arms of the bridge and in separate current paths. This arrangement has the effect of offsetting the voltage drop across strain gauge 40 against the voltage drop across strain gauge 42. Similarly the voltage drop across strain gauge 44 is offset against the voltage drop across strain gauge 46. These offsetting voltage drops, in effect, subtract the voltage drops occurring across strain gauges forming the strain gauge pair 40 and 42 and the pair 44 and 46.

As the resistances of strain gauges 40 and 42 decrease and the resistances of strain gauges 44 and 46 increase a voltage difference occurs between points A and C and the current flow between these points is proportional to the load applied to the bar 12 and may be converted to a visible indication of the magnitude of the load $F_1$ by appropriate circuitry 99.

When forces are applied to the bar 12 from directions perpendicular to the plane of the drawing of FIG. 2 each strain gauge changes its resistance identically, the bridge 103 remains balanced, and no current flows between points A and C to produce a readout. For this reason the apparatus is unresponsive to such undesired extraneous forces. The same result obtains when extraneous forces twist the bar 12 or are directed axially therealong.

When four pairs of strain gauges are used on the bar 12, the preferred manner of connection of the additional strain gauges in the bridge 106 is shown in FIG. 6, although it should be understood that all of the electrical circuitry may be varied in ways known to the art without affecting its efficiency and such variation is within the purview of the invention. The two strain gauges making up each pair of strain gauges are connected in separate current paths of the bridge and in opposite arms to achieve a subtraction effect as already described for the first two pairs of strain gauges. The connections used for the strain gauges 40, 42, 44 and 46 are identical to that already described for them above, whether two or four pairs of strain gauges are used on the bar. Since the operation of the bridge 106 is identical to that already described further explanation will not be made for operation of four pairs of strain gauges instead of two pair of strain gauges.

It should be understood that while an even number of resistances must always be connected in the Wheatstone bridge circuit 103, there need not be an even number of pairs of strain gauges used on the bar 12. If an odd number of pairs of strain gauges is used on the bar, an additional pair of dummy resistances is connected in the bridge circuit, and the invention functions normally. To obtain the described benefits of the differential bending moment principle and to compensate for axially directed forces, twisting forces, and forces perpendicular to the drawing of FIG. 2, at least two pairs of strain gauges are needed and one pair must sense compression and the other pair sense extension. The distance between the two strain gauges forming one pair need not, however, be identical to the distance between strain gauges forming the remaining pairs to obtain satisfactory results. It has been found, however, that the electrical measuring circuitry 101 can be simplified if the distances between the strain gauges of all pairs are equal.

The apparatus 10 is equally effective if the load applying member 30 is supported by a base or foundation or held in a fixed position by other means known to the art, while the load is applied to the first and second bar supporting members 14 and 16. Accordingly, if the load applying member 30 is fixed, the load vector $F_1$ should be considered as a reaction force generated in response to load forces $F_2$ and $F_3$ applied to the bar supporting members 14 and 16, respectively. The force $F_1$ is then equal to the sum of the forces $F_2$ and $F_3$ but is oppositely directed. The forces $F_2$ and $F_3$ cause the ends of the bar 12 to be deformed in the directions of vectors $F_2$ and $F_3$ (FIG. 2) while the portion of the bar 12 retained by the load applying member 30 remains substantially stationary. This results in the strain gauges 40, 42, 44 and 46 detecting deformation of the surfaces on which they are mounted, and a measurement of the load magnitude is produced. Accordingly, it is seen that the apparatus 10 can be used effectively with the load applied to either the load applying member 30 with supporting members 14 and 16 exerting reaction forces on the bar, or the load may be applied to the members 14 and 16 with the member 30 providing a reaction force.

During the weighing of the load $F_1$ the bar 12 is retained in the sockets 22 by pins 28 and 29 which are substantially parallel to one another. Since these pins are parallel, they do not generate any twisting of the bar 12. An orientation of the pins 28 and 29 in any direction other than perpendicular to the plane defined by bar axis 100 and force vector $F_1$ would apply undesired extraneous forces to the bar 12 through the pins 28 and 29, causing it to twist and introducing error into the measurement. Because the diameter of bore 26 is larger than the diameter of pin 28 or 29, minor misalignment between bar 12 and support members 12 and 14 does not have any twisting effect on the bar, thereby avoiding the internal stresses associated with such twisting. When a substantial force $F_1$ deforms bar 12 and causes the bar to exert an axial force on the pins 28 and 29, the force is evenly applied along the length of the pin bore 26 and not isolatedly applied at one or more locations along the bore; in this way the arrangement further avoids the introduction of extraneous twisting forces to the bar.

While the preferred embodiments of the present invention have been described, it should be understood that various changes, adaptations and modifications may be made therein without departing from the spirit of the invention and the scope of the appended claims.

What is claimed is:

1. A deformation-responsive weighing apparatus for weighing a load comprising:
   a substantially straight, longitudinal bar being elastically deformable in response to a load vector applied between the ends thereof;
   a pair of supporting members, each supporting an end of said bar, each supported end of said bar being free to move relative to its said supporting member about an axis generally perpendicular to a plane defined by the longitudinal axis of said bar and the load vector in response to the load vector being applied to the bar between its ends, thereby permitting linear deformation of the bar while avoiding reverse bending of the bar and the resulting nonlinearities of bar deformation caused by reverse bending;
   a load applying member on said bar between said supporting members and contacting said bar at a single location to apply a load to the bar at said single location, said load applying member cooperating with said supporting members to elastically deform said bar when a load is applied to said bar by said load applying member;
   a plurality of pairs of strain gauges operatively mounted on said bar to detect deformation of said bar caused by forces applied to said bar by loading and to vary their electrical properties in response to such deformation, the two strain gauges comprising each pair of strain gauges being longitudinally spaced apart along said bar with the two gauges of each pair of strain gauges being positioned between said load applying member and one of said load supporting members, the longitudinal distance separating the two gauges of each said pair of strain gauges being substantially equal to the distance separating the two gauges of each of the remaining pairs of gauges; and
   electrical measuring circuitry operatively connected to said plurality of pairs of strain gauges to measure the changes in electrical properties of said strain gauges and to produce an output representative of the magnitude of the load applied to the bar.

2. The deformation-responsive weighing apparatus of claim 1 wherein said plurality of pairs of strain gauges includes two pairs of strain gauges on said bar, one pair of strain gauges being positioned between a supporting member and said load applying member and the second pair of strain gauges being positioned between the remaining supporting member and said load applying member.

3. The deformation-responsive weighing apparatus of claim 1 wherein a pair of said plurality of strain gauges is positioned on a portion of said bar to be exposed to substantial compression and a second pair of strain gauges is positioned on a portion of said bar to be exposed to substantial extension as the bar is deformed by the load.

4. The deformation-responsive weighing apparatus of claim 1 wherein all strain gauges are positioned on the said bar in a plane defined by the longitudinal axis of the bar and the load vector of the applied load.

5. The deformation-responsive weighing apparatus of claim 4 wherein one pair of strain gauges is mounted on the bar to detect compression of the bar and a second pair to detect extension of the bar when the bar is deformed by a given load.

6. The deformation-responsive weighing apparatus of claim 1 wherein said electrical measuring circuitry is an impedance-measuring bridge circuit with first and second current paths between a common energy source, and wherein the two strain gauges comprising each pair of strain gauges are electrically connected in said electrical measuring circuitry such that one strain gauge is in said first current path and the second strain gauge is in said second current path, the two strain gauges comprising each pair of strain gauges being electrically connected in opposite arms of said first and second current paths of said electrical measuring circuitry.

7. The deformation-responsive weighing apparatus of claim 6 wherein opposite arms of said first and said second current paths include like numbers of said strain gauges electrically connected therein, and the number of strain gauges arranged on the bar to sense compression of said bar being equal to the number of strain gauges arranged on the bar to sense tension of said bar when a given load is applied.

8. The deformation-responsive weighing apparatus of claim 1 wherein said bar is of uniform, constant diameter circular cross-sectional configuration.

9. A deformation-responsive weighing apparatus for weighing a load comprising:
   a substantially straight, longitudinal bar being elastically deformable in response to a load vector applied between the ends thereof;
   a pair of supporting members, each supporting an end of said bar, each supported end of said bar being free to move relative to its said supporting member about an axis generally perpendicular to a plane defined by the longitudinal axis of said bar and the load vector in response to the load vector being applied to the bar between its ends, thereby permitting linear deformation of the bar while avoiding reverse bending of the bar and the resulting nonlinearities of bar deformation caused by reverse bending;

a load applying member on said bar between said supporting members, said load applying member cooperating with said supporting members to elastically deform said bar when a load is applied to said bar by said load applying member;

a plurality of pairs of strain gauges operatively mounted on said bar to detect deformation of said bar caused by forces applied to said bar by loading and to vary their electrical properties in response to such deformation;

electrical measuring circuitry operatively connected to said plurality of pairs of strain gauges to measure the changes in electrical properties of said strain gauges and to produce an output representative of the magnitude of the load applied to the bar;

each said supporting member including a bar mounting socket to receive an end of said bar therein, each said socket having a pin aperture therethrough;

said bar having a transverse pin bore adjacent each end thereof, said pin aperture of each socket and the pin bore at an end of said bar forming a continuous passage in said bar and socket, said passge being generally perpendicular to a plane defined by the central axis of the bar and the load vector; and each said supporting member further including a bar retaining pin, positioned within said pin aperture and pin bore at each end of said bar to confine the ends of said bar in said sockets.

10. The deformation-responsive weighing apparatus of claim 9 wherein said pins are of smaller diameter than said pin bores in said bar permitting said bar to undergo small movements about the pins to thereby substantially eliminate undesirable extraneous deformations in said bar.

11. A deformation-responsive weighing apparatus for weighing a load comprising:

a substantially straight, longitudinal bar being elastically deformable in response to a load vector applied between the ends thereof;

a pair of supporting members, each supporting an end of said bar, each supported end of said bar being free to move relative to its said supporting member about an axis generally perpendicular to a plane defined by the longitudinal axis of said bar and the load vector in response to the load vector being applied to the bar between its ends, thereby permitting linear deformation of the bar while avoiding reverse bending of the bar and the resulting nonlinearities of bar deformation caused by reverse bending;

a load applying member on said bar between said supporting members, said load applying member cooperating with said supporting members to elastically deform said bar when a load is applied to said bar by said load applying member;

a plurality of pairs of strain gauges operatively mounted on said bar to detect deformation of said bar caused by forces applied to said bar by loading and to vary their electrical properties in response to such deformation;

electrical measuring circuitry operatively connected to said plurality of pairs of strain gauges to measure the changes in electrical properties of said strain gauges and to produce an output representative of the magnitude of the load applied to the bar;

said load-applying member having a pin aperture therethrough;

said bar having a pin bore communicating with said pin aperture, said aperture and bore forming a passage generally perpendicular to a plane defined by the longitudinal axis of said bar and the load vector; and a retaining pin in said passage to retain the said load-applying member on said bar with minimal generation of extraneous deformation.

12. A deformation-responsive weighing apparatus for weighing a load comprising:

a substantially straight, longitudinal bar of uniform, circular cross-sectional configuration being elastically deformable in response to a load vector applied between the ends thereof;

a pair of supporting members, one of said members being adjacent each end of said bar and supporting an end of said bar;

a load applying member on said bar between said supporting members and contacting said bar at a single location to apply a load to the bar at said single location, said load applying member cooperating with said supporting members to elastically deform said bar when a load is applied to said bar by said load applying member;

a plurality of pairs of strain gauges operatively mounted on said bar to detect deformation of said bar caused by forces applied to said bar by loading and to vary their electrical properties in response to such deformation, the two strain gauges comprising each pair of strain gauges being longitudinally spaced apart along said bar with the two gauges of each pair of strain gauges being positioned between said load applying member and one of said load supporting members, the longitudinal distance separating the two gauges of each said pair of strain gauges being substantially equal to the distance separating the two gauges of each of the remaining pairs of gauges; and electrical measuring circuitry operatively connected to said plurality of pairs of strain gauges to measure the changes in electrical properties of said strain gauges and to produce an output representative of the magnitude of the load applied to the bar.

* * * * *